(12) United States Patent
Kapinos et al.

(10) Patent No.: US 11,226,715 B2
(45) Date of Patent: Jan. 18, 2022

(54) UNIVERSAL SIZE DESIGNATION FOR DISPLAY ELEMENT DURING DISPLAY AND TRANSFER

(71) Applicant: Lenovo (Singapore) Pte. Ltd., Singapore (SG)

(72) Inventors: Robert James Kapinos, Durham, NC (US); Scott Wentao Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/587,614

(22) Filed: Sep. 30, 2019

(65) Prior Publication Data

US 2021/0096727 A1 Apr. 1, 2021

(51) Int. Cl.
*G06F 3/0481* (2013.01)
(52) U.S. Cl.
CPC ................................ *G06F 3/04817* (2013.01)
(58) Field of Classification Search
None
See application file for complete search history.

(56) References Cited

U.S. PATENT DOCUMENTS

| 5,459,825 | A | * | 10/1995 | Anderson | G06F 3/0481 715/202 |
|---|---|---|---|---|---|
| 7,961,202 | B2 | * | 6/2011 | Conner | G09G 5/14 345/660 |
| 9,965,155 | B2 | * | 5/2018 | Keysers | G06F 3/04842 |
| 2002/0167531 | A1 | * | 11/2002 | Baudisch | G06F 3/1438 345/611 |
| 2006/0001593 | A1 | * | 1/2006 | Baudisch | G06F 3/1446 345/1.1 |
| 2008/0030425 | A1 | * | 2/2008 | Fullerton | G06F 3/04845 345/1.1 |
| 2009/0009511 | A1 | * | 1/2009 | Ueda | H04N 21/4117 345/419 |
| 2016/0327399 | A1 | * | 11/2016 | Ronnang | B60K 35/00 |
| 2016/0334892 | A1 | * | 11/2016 | Suggs | G06F 3/005 |
| 2018/0060740 | A1 | * | 3/2018 | Bradley | G06F 9/5077 |

* cited by examiner

*Primary Examiner* — Jason A Pringle-Parker
(74) *Attorney, Agent, or Firm* — Ference & Associates LLC

(57) ABSTRACT

One embodiment provides a method, including: receiving, at an information handling device, an indication to display an element; identifying, using a processor, a universal size designation for the element; and displaying, on a display associated with the information handling device, the element at a size associated with the universal size designation and irrespective of a screen scaling factor associated with the display. Other aspects are described and claimed.

7 Claims, 3 Drawing Sheets

UNIVERSAL SIZE DESIGNATION FOR DISPLAY ELEMENT DURING DISPLAY AND TRANSFER

BACKGROUND

Display screens integrally or operatively coupled to information handling devices ("devices"), for example laptop and/or personal computers, generally display elements (e.g., text, icons, applications windows, navigation elements, etc.) according to predetermined display settings (e.g., that may be based on one or more factors such as the native display resolution, dimensions of the display, etc.). When these elements are moved to another display screen having different display settings then the size of these elements may change.

BRIEF SUMMARY

In summary, one aspect provides a method, comprising: receiving, at an information handling device, an indication to display an element; identifying, using a processor, a universal size designation for the element; and displaying, on a display associated with the information handling device, the element at a size associated with the universal size designation and irrespective of a screen scaling factor associated with the display.

Another aspect provides An information handling device, comprising: a processor; a memory device that stores instructions executable by the processor to: receive an indication to display an element; identify a universal size designation for the element; and display, on a display associated with the information handling device, the element at a size associated with the universal size designation and irrespective of a screen scaling factor associated with the display.

A further aspect provides a product, comprising: a storage device that stores code, the code being executable by a processor and comprising: code that receives an indication to display an element; code that identifies a universal size designation for the element; and code that displays the element at a size associated with the universal size designation and irrespective of a screen scaling factor associated with the display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
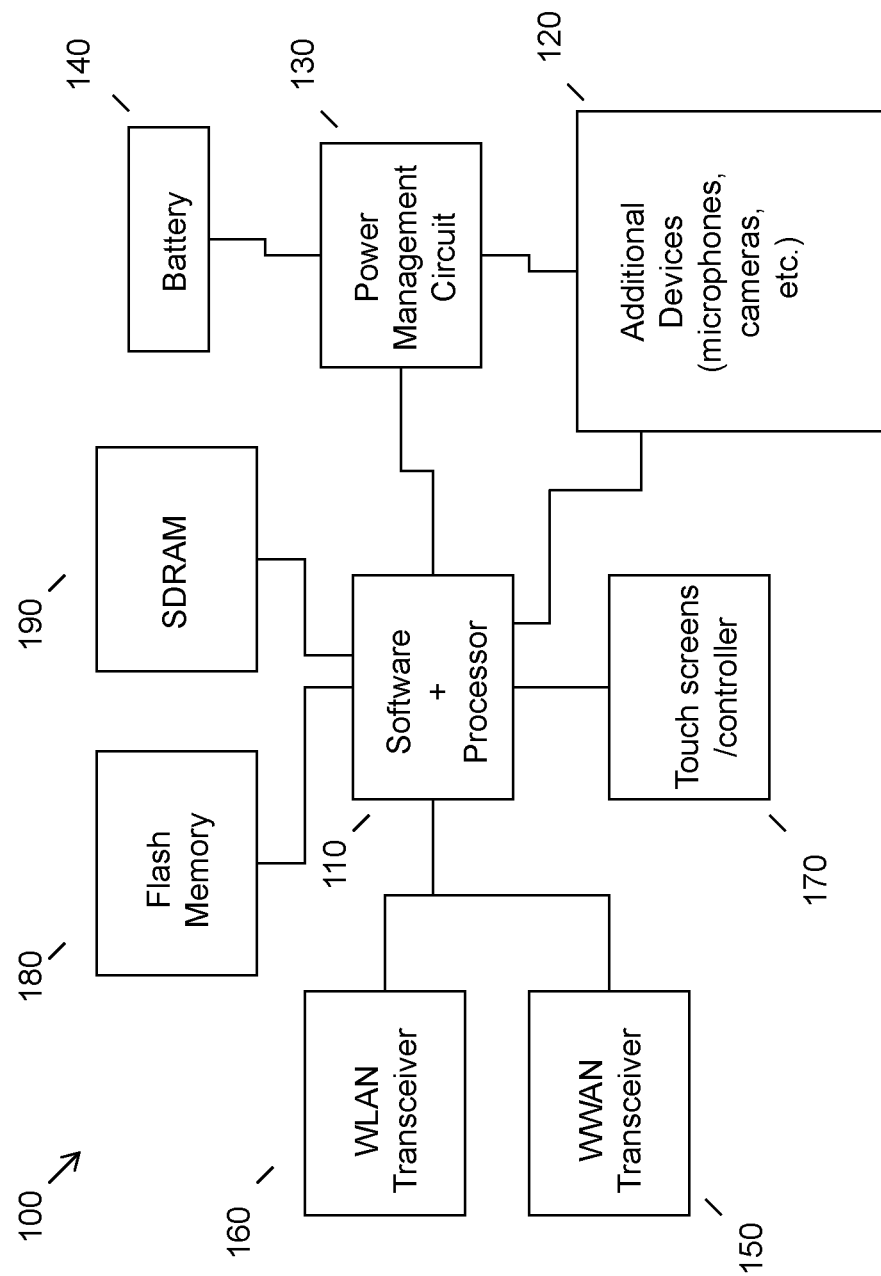
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Generally, a display screen may have a single scaling factor that controls the size of all elements (e.g., text, icons, applications windows, navigation elements, etc.) displayed on it. More particularly, when an element is initialized (i.e., activated to be displayed) or transferred to a particular display, the dots per inch (DPI) size at which the particular element is displayed at is dependent on the native scaling factor. Issues may arise when the native scaling factor is not compatible with the intended nature of the element. Specifically, certain elements may have an intended, or desired, viewing size that the scaling factor associated with different displays may distort (e.g., an application window may appear too large or too small, text may be blurred, etc.). As the tendency for users to interact with elements across different monitors, especially disparately sized monitors having different resolutions, becomes more prevalent, solutions are needed to better manage the size of elements.

One conventional solution allows programs to dynamically scale themselves to the dot pitch of the native display. However, this solution requires a large amount of program intelligence and generally only works for programs that do not distort when their size is adjusted (i.e., some windows operate best at a fixed size and become distorted when their size is changed). Another conventional solution is directed to the concept of screen area magnification, in which some programs can make the area inside their client window larger or smaller by zooming (e.g., the magnification within a web browser may be increased, etc.). However, this solution fails to handle differences on different screens (e.g., certain programs do not need to be magnified on larger screens, etc.) and differences between screen element desires by the user. Yet another solution is directed to the independent scaling of fonts and picture elements. More particularly, this scaling fails to produce the same output on all screens due to the differences with respect to screen size and DPI differences.

Accordingly, an embodiment provides a method for assigning a universal size designation for each element displayed on a monitor and maintaining the size associated with this designation when the element is transferred, or opened, on a disparately sized monitor. In an embodiment, an indication to display an element on a display screen may be received at a device (e.g., an indication to initialize an element, a transfer indication, etc.). An embodiment may then identify a universal size designation (e.g., a DPI size designation, etc.) assigned to that element and thereafter display the element at a size associated with the universal size designation. In an embodiment, the size associated with the universal size designation may be maintained across all monitors and may allow the element to be displayed at the size irrespective of a screen scaling factor associated with a native display. Such a method may allow elements to retain their user-desired size when they are displayed on different monitors.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
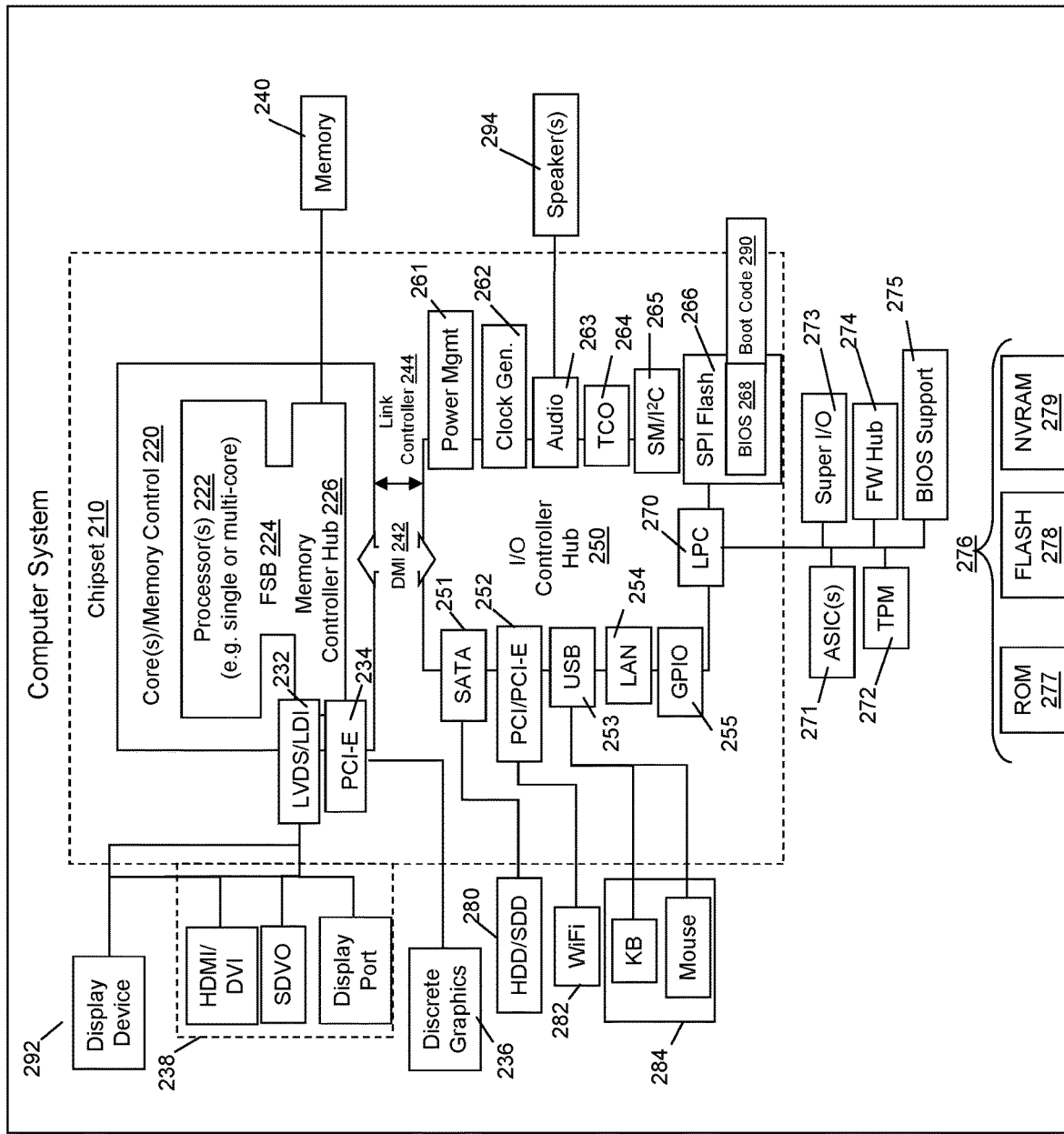
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of supporting at least one display screen. For example, the circuitry outlined in FIG. 1 may be implemented in a laptop embodiment, whereas the circuitry outlined in FIG. 2 may be implemented in a PC.

Figure 3:
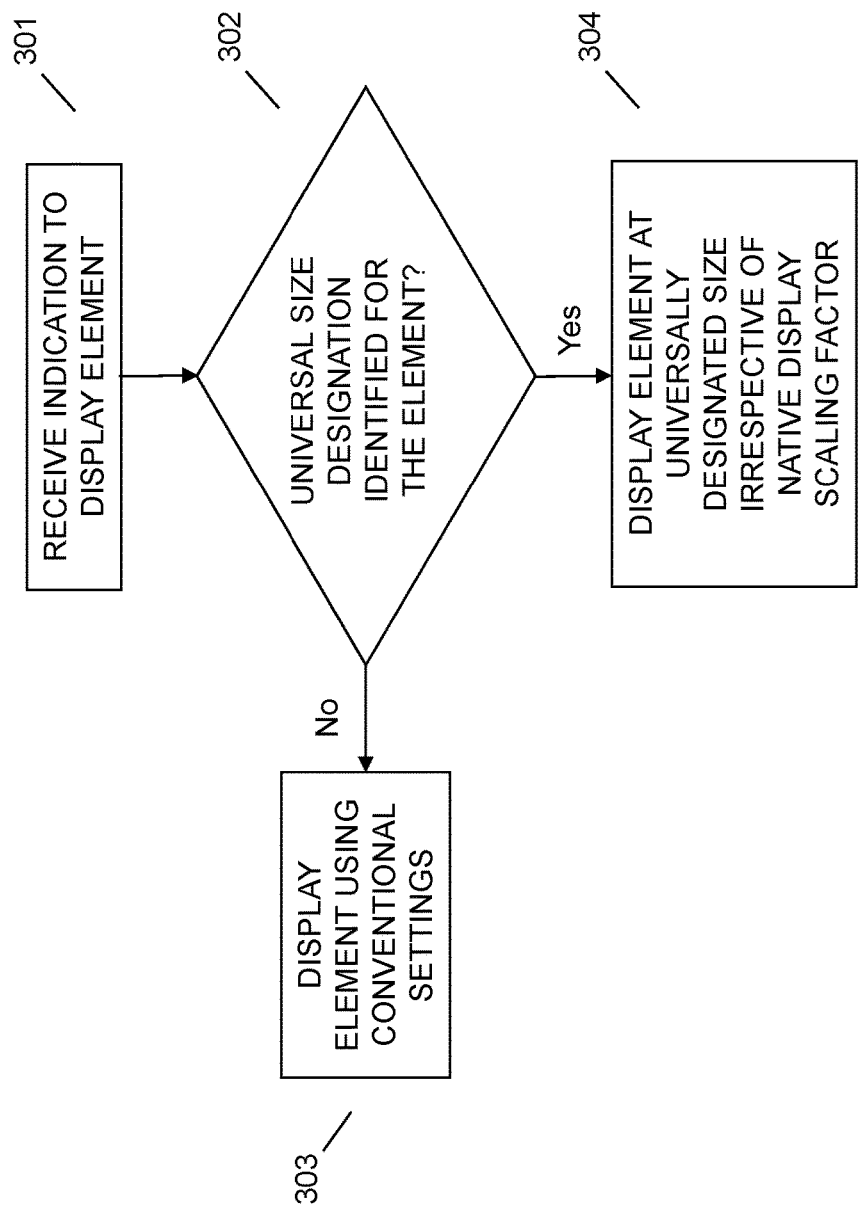
FIG. 3 illustrates an example method of displaying an element on a display screen based on a universal size designation for the element.

Referring now to FIG. 3, an embodiment may display elements according to their universal size designation. At 301, an embodiment may receive an indication to display an element on a display screen integrally or operatively coupled to the device. In the context of this application, the element may refer to virtually any digital element that may be displayed on a display screen (e.g., text, icons, applications windows, navigation elements, etc.).

In an embodiment, the indication to display the element may be associated with an initialization indication. For example, an embodiment may receive a command from a user to launch an application window (e.g., by user interaction with a shortcut icon, etc.). As another example, the initialization indication may correspond to the initialization of the operating system. More particularly, responsive to identifying that the system has started, an embodiment may thereafter display one or more home screen elements (e.g., one or more desktop icons, taskbar icons, search bars, etc.).

In an embodiment, the indication to display the element may be associated with a transfer indication. The transfer indication may correspond to the movement of an element from one display screen to another display screen. For example, in a conventional dual monitor setup where two display screens are both connected to the device and positioned next to each other, a user may select an element on one display screen and seamlessly move it over to the adjacent display screen (e.g., via clicking and dragging, etc.). As another example, a user may select an element on a mobile device (e.g., a tablet, etc.) and wireless transmit it (e.g., via a BLUETOOTH connection, a near field communication (NFC) connection, another type of wireless connection, etc.) to another device (e.g., a laptop computer or other monitor, etc.).

At 302, an embodiment may identify a universal size designation for the element. In the context of this application, the universal size designation may refer to a size associated with the element that may be consistent across any display screen that displays the element. Stated differently, an element may appear the same, real-world size on two different display screens, where the two display screens may have different dimensions, resolutions, overall native scaling factors, etc.

In an embodiment, the universal size designation associated with the element may correspond to an assigned DPI size. More particularly, each element inside the OS that gets drawn may be independently assigned a real-world DPI, which identifies the real world size it should be displayed at (e.g., 100 DPI, etc.) in the real world. Thereafter, by utilizing existing algorithms for relating the dot pitches of the display screen, its dimensions, resolution, and/or aspect ratio, the OS may then draw that element at that specific scaling factor/DPI size, regardless of which display it is being presented on.

In an embodiment, the DPI size for an element may be originally set by a manufacturer and/or may later be adjusted or established by a user. Additionally or alternatively, for new elements that appear after the designations to the elements are originally assigned may be dynamically assigned a crowdsource DPI size. For example, an embodiment may access a database (e.g., stored locally on the device, stored remotely on another device or server, etc.) that comprises data related to common sizes that other users have assigned to the new element and thereafter adopt that size designation. Alternatively, an embodiment may identify a particular aspect ratio utilized for like elements on a particular display screen and thereafter adopt that size designation.

In an embodiment, the DPI size may be assigned to each individual element (e.g., each icon, each application, etc.). For example, a user may desire for a window associated with a specific media watching application to appear at a larger size than a window associated with a different media watching application. Alternatively, in another embodiment, all like elements may be assigned the same, or similar, DPI size. For example, all desktop icons may be assigned the same DPI size, all windows associated media watching applications may be assigned the same DPI size, all windows associated with word processing applications may be assigned the same DPI size, etc.

In an embodiment, the universal size designations described above may be stored at an accessible storage location so that they may be readily accessed from one or more devices. For example, the universal size designations may be stored in a cloud service that a user's device may have immediate access to. Accordingly, when a user logs into a device that is able to access the cloud service, the universal size designations for all designated elements may be identified and thereafter implemented on the user's device.

Responsive to not identifying, at 302, a universal size designation for the element, an embodiment may, at 303, take no additional action. Additionally or alternatively, an embodiment may display the element using default display settings (e.g., with reference to the scaling factor on the native display, etc.). Conversely, responsive to identifying, at 302, a universal size designation for the element, an embodiment may, at 304, display the element at a size associated with the universal size designation.

As previously mentioned, an embodiment may display the element at the universally designated size irrespective of a native scaling factor associated with the display screen it is initialized on or transferred to. For example, windows associated with a particular word processing application may have been assigned to appear at 130 DPI. Subsequently, when a window associated with the word processing application is transferred to another display (e.g., a 100% scaled 24" 1080p monitor, etc.), then the window will scale itself down so that it appears at the consistent size (i.e., 130 DPI).

The various embodiments described herein thus represent a technical improvement to conventional methods for displaying elements on a display screen associated with a device. Using the techniques described herein, an embodiment may receive an indication to display an element on a display (e.g., an initialization indication, a transfer indication, etc.). An embodiment may then identify a universal size designation for the element (e.g., a DPI size designation, etc.) and thereafter display the element at the universally designated size. The element may be displayed at the universally designated size irrespective of any native scaling factor associated with the display screen it is being displayed upon. Such a method may allow for more consistent sizing of elements across disparate displays and minimize the instances of manual user size adjustment on these elements.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, an indication to transfer an element from a first display associated with the information handling device to a second display associated with the information handling device, wherein the first display has an element scaling factor different than the second display;
identifying, using a processor, a dots per inch (DPI) designation for an element type that the element belongs to, wherein each element associated with the element type is assigned the DPI designation and wherein another element of a different element type has a different DPI designation, wherein the identifying the DPI designation comprises:
accessing, subsequent to logging into the information handling device, data stored in a cloud service accessible to the information handling device;
identifying, within the cloud service, a crowdsourced DPI designation for the element; and
implementing, on the information handling device, the DPI designation from the cloud service;
displaying, responsive to the identifying and based on the DPI dot pitch designation and irrespective of the element scaling factor, the element on the second display at a size that the element was displayed at on the first display; and
displaying, responsive to not identifying the DPI designation for the element, the element on the second display using a default size setting.

2. The method of claim 1, wherein the element comprises a visual element selected from the group consisting of a window, an icon, a bitmap, a cursor, and a control.

3. The method of claim 1, wherein the receiving the indication to display comprises receiving an initialization indication for the element.

4. An information handling device, comprising:
a processor;
a memory device that stores instructions executable by the processor to:
receive an indication to transfer an element from a first display associated with the information handling device to a second display associated with the information handling device, wherein the first display has an element scaling factor different than the second display;
identify a dots per inch (DPI) designation for an element type that the element belongs to, wherein each element associated with the element type is assigned the DPI designation and wherein another element of a different element type has a different DPI designation, wherein the instructions executable by the processor to identify the DPI designation comprise instructions executable by the processor to:
access, subsequent to logging into the information handling device, data stored in a cloud service accessible to the information handling device;
identify, within the cloud service, a crowdsourced DPI designation for the element; and
implement, on the information handling device, the DPI designation from the cloud service;
display, based on the DPI designation and irrespective of the element scaling factor, the element on the second display at a size that the element was displayed at on the first display; and
display, responsive to not identifying the DPI designation for the element, the element on the second display using a default size setting.

5. The information handling device of claim 4, wherein the element comprises a visual element selected from the group consisting of a window, an icon, a bitmap, a cursor, and a control.

6. The information handling device of claim 4, wherein the instructions executable by the processor to receive the indication to display comprise instructions executable by the processor to receive an initialization indication for the element.

7. A product, comprising:
a storage device that stores code, the code being executable by a processor and comprising:
code that receives an indication to transfer an element from a first display associated with an information handling device to a second display associated with the information handling device, wherein the first display has an element scaling factor different than the second display;
code that identifies a dots per inch (DPI) designation for an element type that the element belongs to, wherein each element associated with the element type is assigned the DPI designation and wherein another element of a different element type has a different DPI designation, wherein the code that identifies the DPI designation comprises code that:
- access, subsequent to logging into the information handling device, data stored in a cloud service accessible to the information handling device;
- identifies, within the cloud service, a crowdsourced DPI designation for the element; and
- implements, on the information handling device, the DPI designation from the cloud service;

code that displays, based on the DPI designation and irrespective of the element scaling factor, the element on the second display at a size that the element was displayed at on the first display; and
code that displays, responsive to not identifying the DPI designation for the element, the element on the second display using a default size setting.

\* \* \* \* \*